(12) United States Patent
Yamada

(10) Patent No.: US 8,384,931 B2
(45) Date of Patent: Feb. 26, 2013

(54) IMAGE PROCESSING SYSTEM AND CONTROL METHOD THEREFOR

(75) Inventor: Naoto Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 694 days.

(21) Appl. No.: 12/200,547

(22) Filed: Aug. 28, 2008

(65) Prior Publication Data

US 2009/0059287 A1    Mar. 5, 2009

(30) Foreign Application Priority Data

Aug. 31, 2007 (JP) .................... 2007-226698

(51) Int. Cl.
G06F 3/12 (2006.01)
G06K 5/00 (2006.01)
G06K 7/01 (2006.01)

(52) U.S. Cl. .... 358/1.15; 358/1.13; 235/382; 235/382.5

(58) Field of Classification Search .................. 252/382; 235/382.5, 382; 358/1.13, 1.15
See application file for complete search history.

(56) References Cited

U.S. PATENT DOCUMENTS 7,039,558 B2    5/2006    Isshiki
2005/0206949 A1*  9/2005  Iseki et al. .................. 358/1.15
2006/0065720 A1*  3/2006  Asako et al. ................. 235/382

FOREIGN PATENT DOCUMENTS

JP    2002-033868 A    1/2002

* cited by examiner

*Primary Examiner* — Charlotte M Baker
*Assistant Examiner* — Justin Katzwhite
(74) *Attorney, Agent, or Firm* — Carter, DeLuca, Farrell & Schmidt LLP

(57) ABSTRACT

An image processing apparatus which permits service providing an image forming that has high priority is selected as an image processing apparatus for storing count information by using service information representing whether each image processing apparatus permits counting the usage of printing materials in order to allow charging of service for providing the image forming associated with each user identification information, and a priority table for storing count information based on the contents of image forming. When image forming is executed, the count information representing the contents of the executed image forming is transmitted to the selected image processing apparatus, thereby causing the selected image processing apparatus to store the count information.

9 Claims, 14 Drawing Sheets

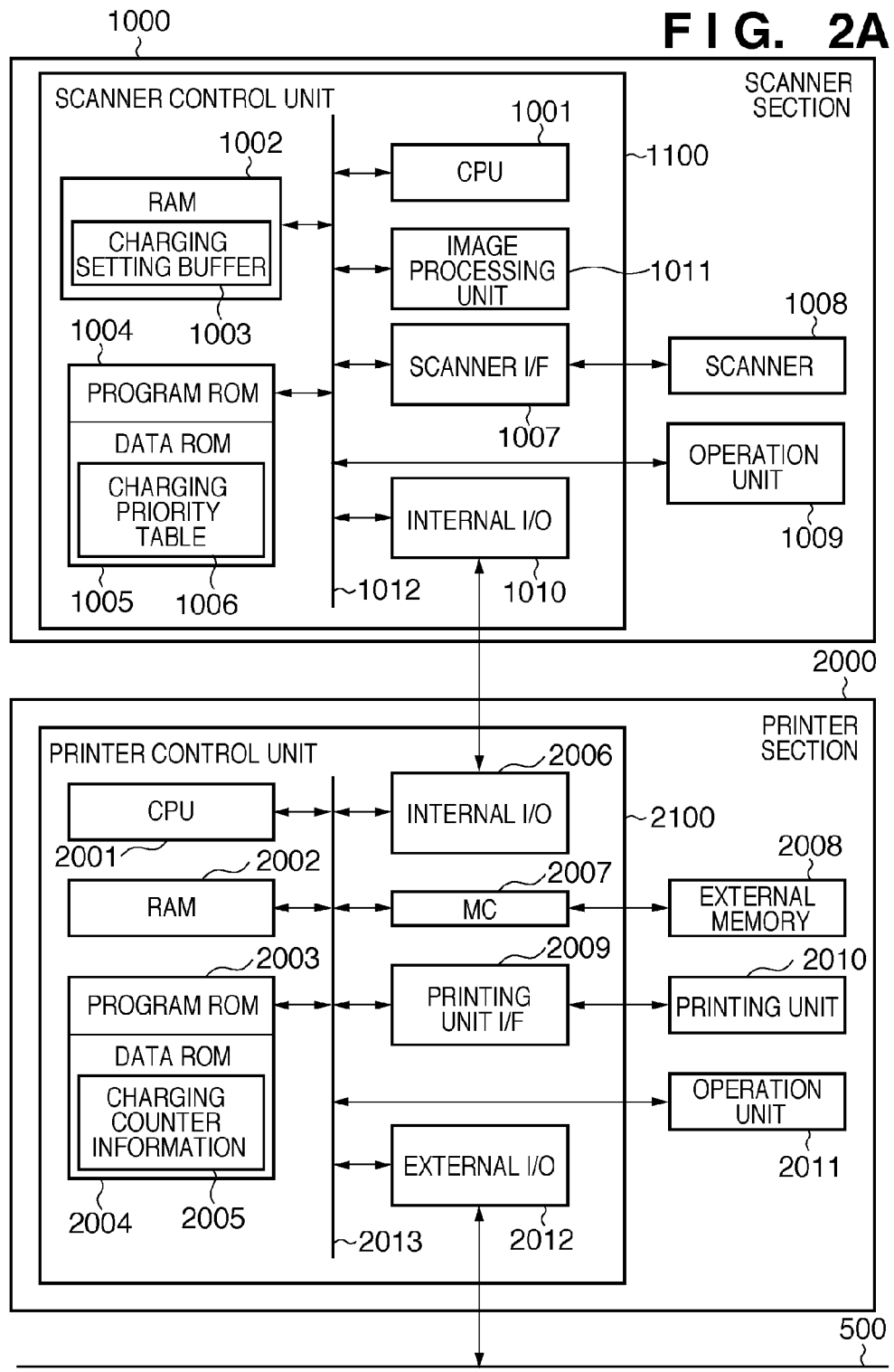

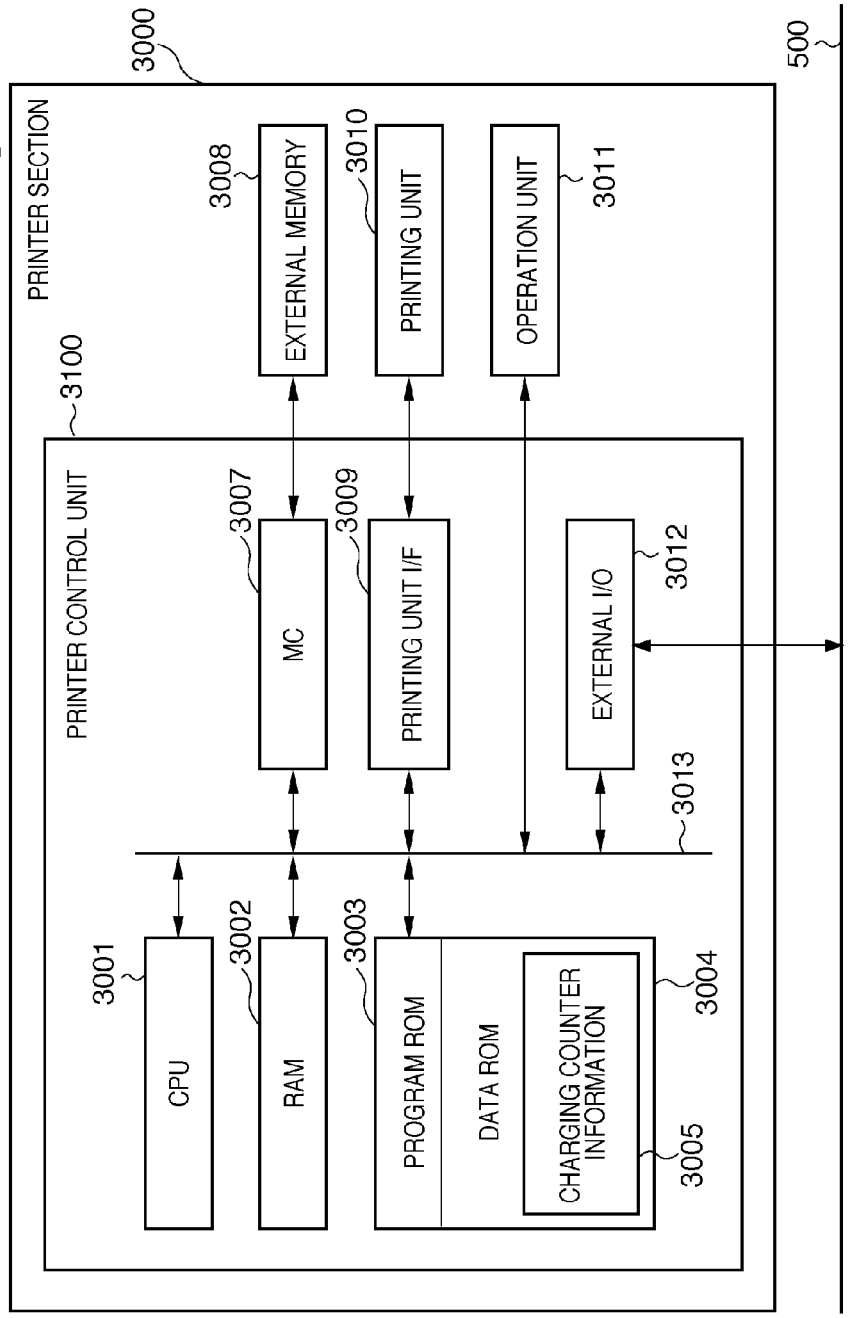

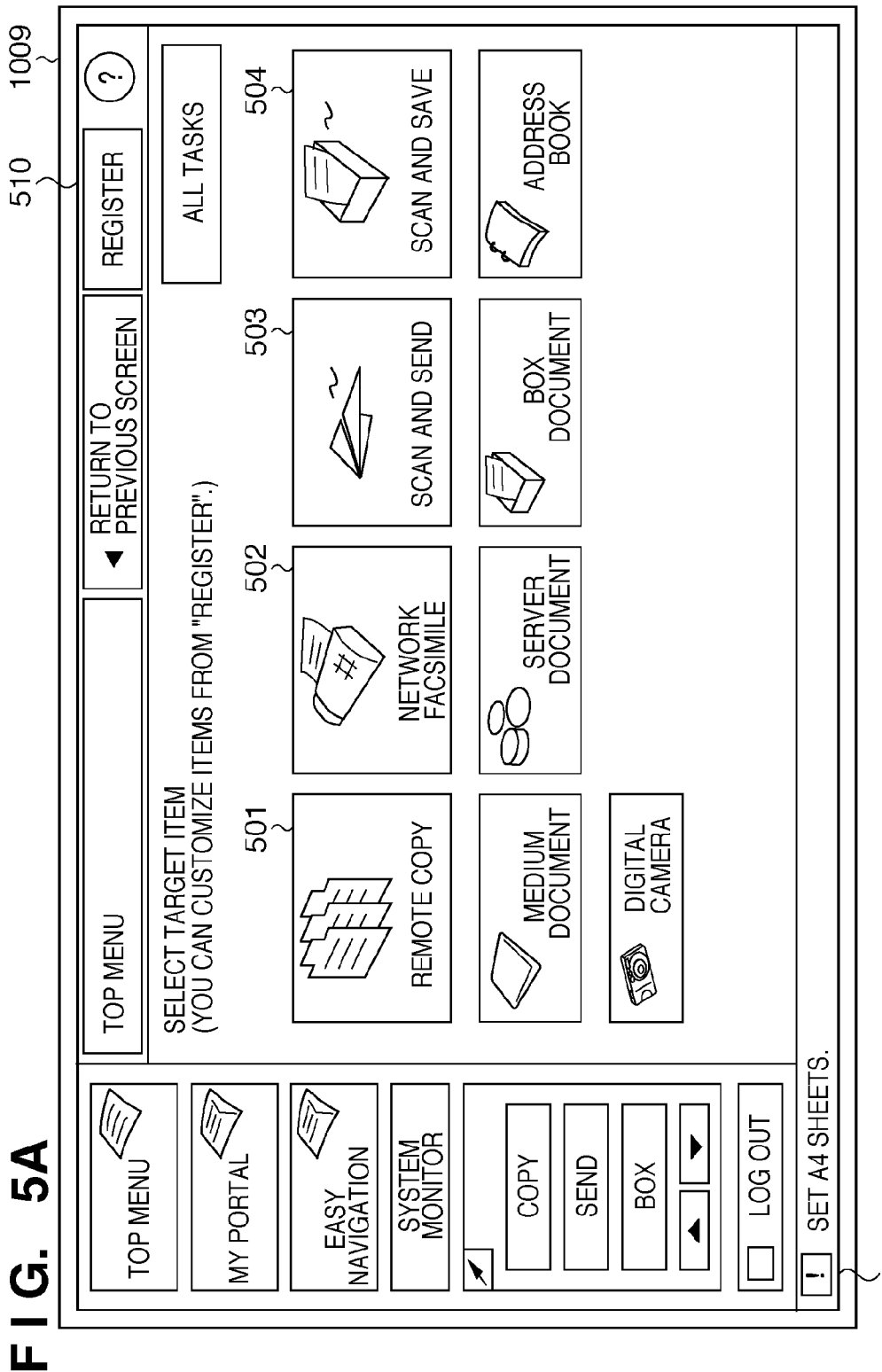

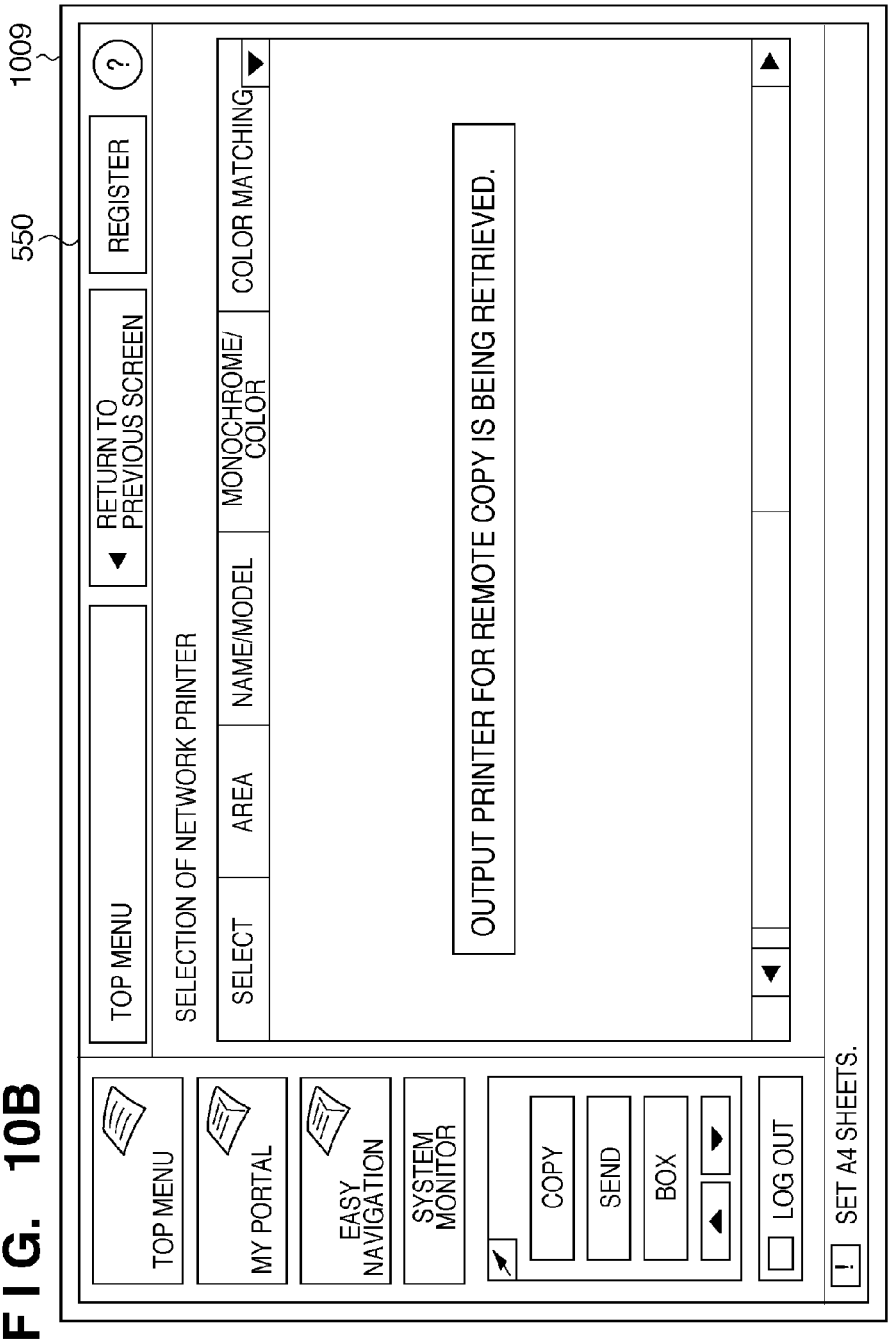

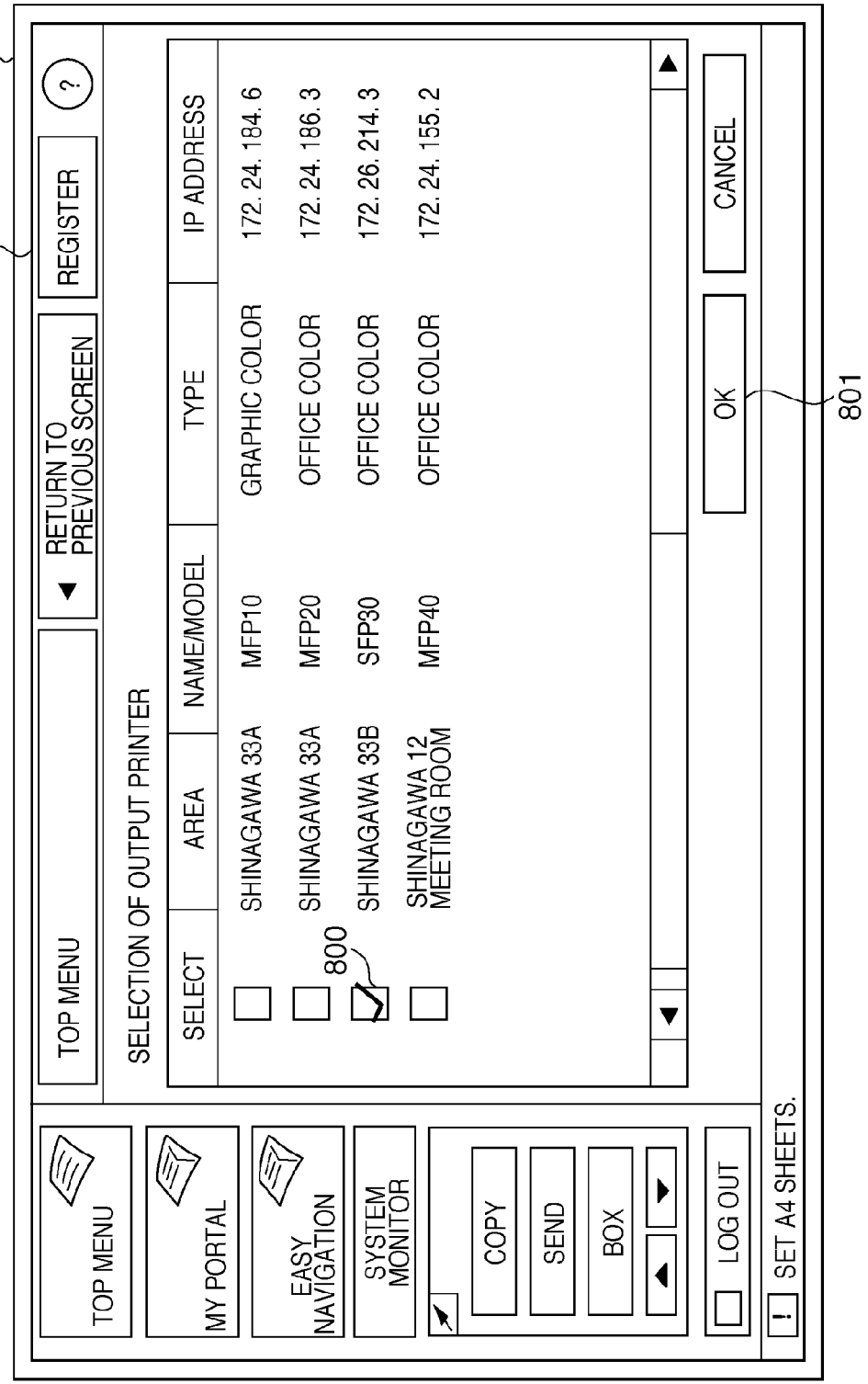

IMAGE PROCESSING SYSTEM AND CONTROL METHOD THEREFOR

BACKGROUND OF THE INVENTION

1. Field of the Invention

The present invention relates to an image processing system configured by connecting a plurality of image processing apparatuses via a network, and a control method therefore.

2. Description of the Related Art

There has already been proposed a system which implements a remote copy function of transferring image data via a network from an image processing apparatus which has obtained the image data by scanning an original to an image processing apparatus having a print function. In this system, the printing apparatus generally controls to count the number of print sheets for charging and the like. The system becomes convenient for the user if it can implement a remote copy function by connecting a multi-function peripheral having functions such as copying, printing, and facsimile to a printer having only the print function.

A multi-function peripheral with multiple functions can count the number of print sheets by using a hard or soft counter. However, many single-function printers do not have the counting function. When an image is read from a multi-function peripheral and printed by a single-function printer using the remote copy function, counting control cannot be done normally.

Japanese Patent Laid-Open No. 2002-033868 proposes a system which decides an apparatus for performing charging control upon determining whether the image reading side and output side have the charging control function. For example, when both the reading side and output side have the charging control function, only the output side performs charging. If either the reading side or output side has the charging control function, the side with this function performs charging. This can suppress inexecution of charging and double charging.

In recent offices and the like, a plurality of multi-function peripherals permit a user to use the copy function and control charging when he inputs a user ID together with a password via an operation unit. The administrator of multi-function peripherals can restrict charging-related operations by another department or an outside user.

However, in the conventional system, the user decides a charging apparatus depending solely on the presence/absence of the charging control function. Even if another department or an outside user uses the remote copy function, the apparatus having the copy function is also charged. The administrator has to pay the charge of the copying service used by another department or an outside user. The system cannot correctly charge a user who uses the service.

SUMMARY OF THE INVENTION

The present invention enables realization of an image processing system capable of properly charging a user when image processing apparatuses in the system cooperate with each other, and a control method therefore.

One aspect of the present invention provides an image processing system in which a plurality of image processing apparatuses are connected via a network and cooperate to execute image forming using a printing material, the system comprising: a storage unit configured to store service information representing whether each of the image processing apparatus permits counting usage of the printing materials in order to allow charging of service for providing the image forming associated with each user identification information, and a priority table which sets priority of an image processing apparatus for storing count information based on contents of the image forming after execution of the image forming; a counting destination selection unit configured to select, as the image processing apparatus for storing the count information by using the service information and the priority table corresponding to the user identification information, the image processing apparatus which permits the service and has high priority; and a count information storage unit configured to, when the plurality of image processing apparatuses cooperate to execute image forming, cause the selected image processing apparatus to store the count information by transmitting the count information to the selected image processing apparatus.

Another aspect of the present invention provides a method of controlling an image processing system in which a plurality of image processing apparatuses are connected via a network and cooperate to execute image forming using a printing material, the method comprising: selecting an image processing apparatus which permits a service and has high priority, as an image processing apparatus for storing count information by using service information representing whether each of the image processing apparatus permits counting usage of the printing materials in order to allow charging of service for providing the image forming associated with each user identification information, and a priority table which sets priority of an image processing apparatus for storing count information based on contents of the image forming after execution of the image forming; and transmitting, when the image forming is executed, the count information representing the contents of the executed image forming to the selected image processing apparatus, thereby causing the selected image processing apparatus to store the count information.

Further features and aspects of the present invention will become apparent from the following description of exemplary embodiments with reference to the attached drawings.

BRIEF DESCRIPTION OF THE DRAWINGS

FIG. 2A is a block diagram showing the control configuration of an MFP 10 according to the first embodiment.

FIG. 2B is a block diagram showing the control configuration of an SFP 30 according to the first embodiment.

FIG. 5A is a view showing an operation screen 510 displayed after user authentication according to the first embodiment.

FIG. 10B is a view showing a retrieval screen 550 according to the second embodiment.

FIG. 10C is a view showing a retrieval result screen 560 according to the second embodiment.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Image Processing System>

Figure 1:
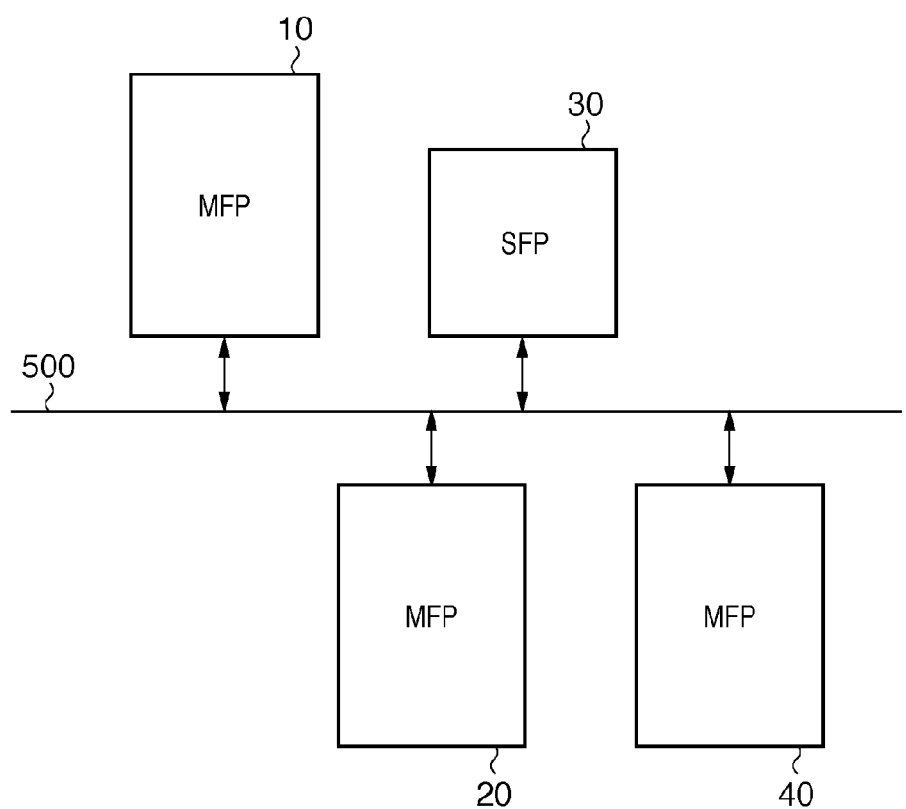
FIG. 1 is a block diagram showing an example of the configuration of an image processing system 100 according to the first embodiment.

The first embodiment will be described with reference to FIGS. 1 to 8. FIG. 1 is a block diagram showing an example of the configuration of an image processing system 100 according to the first embodiment. The following image processing system 100 is merely an application example, and the present invention is not limited to this. That is, the image processing system 100 according to the present invention may also include other devices.

The image processing system 100 comprises a plurality of image processing apparatuses such as multi-function printers (to be referred to as MFPs hereinafter) 10, 20, and 40 and a single-function printer (to be referred to as an SFP hereinafter) 30. The image processing apparatuses are connected via a network 500. The MFPs 10, 20, and 40 are multi-function peripherals having functions such as copy, print, fax, and scan. The SFP 30 has only the print function. The MFPs 10, 20, and 40 have a charging control function of charging a user for an executed service (function of storing information obtained by counting the number of print sheets or the like in order to enable charging). The image processing system 100 assumes that the SFP 30 does not have the charging control function. The executed service includes copy, print, fax, and scan operations.

The control configurations of the MFPs 10, 20, and 40 and the SFP 30 will be explained with reference to FIGS. 2A and 2B. FIG. 2A is a block diagram showing the control configuration of the MFP 10 according to the first embodiment. Since the MFPs 10, 20, and 40 have the same control configuration, only the MFP 10 will be explained.

As shown in FIG. 2A, the MFP 10 comprises a scanner section 1000 and printer section 2000. The scanner section 1000 has a scanner 1008, operation unit 1009, and scanner control unit 1100. The operation unit (e.g., touch panel) 1009 has various switches, an LED display, and the like to be operated by the user, and functions as a display device and input device.

The scanner control unit 1100 controls the entire scanner 1008. The scanner control unit 1100 receives image data obtained by scanning with the scanner 1008 as a video signal, performs an image process, and sends the resultant image data to the printer section 2000 via an internal I/O 1010. The image data sent to the printer section 2000 undergoes an image process and is printed. The image data is also sent to the network 500 via an external I/O 2012, and transmitted to another MFP or SFP.

The scanner control unit 1100 comprises a CPU 1001, a RAM 1002, a program ROM 1004, a data ROM 1005, an image processing unit 1011, a scanner I/F 1007, and the internal I/O 1010. These components are connected by a system bus 1012.

The CPU 1001 controls various devices connected to the system bus 1012 based on a control program stored in the program ROM 1004 to perform a process and the like, a control program stored in the RAM 1002, and the like. The CPU 1001 functions as a counting destination selection unit, count information storage unit, authentication unit, display control unit, output destination selection unit, and prohibition unit. Each unit will be explained with reference to FIG. 8.

The data ROM 1005 stores, as data, a priority table 1006 for deciding a charging device. The data ROM 1005 stores service information representing, for each ID information to identify a user, whether each printer permits a service for providing the print function by counting in order to enable charging. The RAM 1002 functions as a main memory, work area, and the like for the CPU 1001. The RAM 1002 has a charging setting buffer 1003. The charging setting buffer 1003 stores settings for controlling a charging counter for the charging log at the end of printing (including remote copy). Charging information (count information) including at least the type of printing mode, the type of printing material (paper sheet) used to print, and the number (usage) of printing materials used to print is set in the charging setting buffer 1003. The type of printing mode represents, e.g., monochrome printing or color printing. The type of printing material may also include the type of printing material such as plain paper, thick paper, or glossy paper, and the size of the printing material such as A4 or B5. The number of printing materials used to print desirably represents the number of printing materials printed normally. Instead of the number of printing materials, the number of printing sides (the number of printing sides=1 for single-sided printing or 2 for double-sided printing) may also be adopted. The above-mentioned charging information need not always be used for charging, and count information suffices to represent a user, an executed process, and the usage.

The scanner I/F 1007 inputs image data of an image scanned by the scanner 1008 into the scanner control unit 1100. For the image data input via the scanner I/F 1007, the image processing unit 1011 executes at least one of image processes such as data compression, resolution conversion, enlargement/reduction, clipping, and multilevel/binary conversion. The image data processed by the image processing unit 1011 is transmitted to the printer section 2000 (to be described later) via the internal I/O 1010.

The printer section 2000 acquires print information (image data) and the like supplied from the network 500 or the internal I/O 1010 of the scanner section 1000, stores it, and forms an image corresponding to the print information on a printing material. The printer section 2000 comprises an external memory 2008, printing unit 2010, operation unit (panel) 2011, and printer control unit 2100. The operation panel 2011 has various switches, an LED display, and the like to be operated by the user.

The printer control unit 2100 controls the entire print function of the MFP 10, and analyzes print information and the like supplied from an external apparatus. Further, the printer control unit 2100 converts a character pattern corresponding to character information into a video signal, and transmits the video signal to the printing unit 2010. The printer control unit 2100 comprises a CPU 2001, RAM 2002, program ROM 2003, data ROM 2004, memory controller (MC) 2007, printing unit interface (I/F) 2009, internal I/O 2006, and external I/O 2012. These components are connected by a system bus 2013.

The CPU 2001 controls various devices connected to the system bus 2013 based on a control program stored in the program ROM 2003 to perform a process (to be described later), a control program stored in the external memory 2008, and the like. The CPU 2001 outputs an image signal to the printing unit 2010 connected via the printing unit interface 2009, and causes the printing unit 2010 to print. The data ROM 2004 stores charging counter information 2005 as log information of charged services executed by the MFP.

The printer section 2000 can communicate with the scanner section 1000 via the internal I/O 2006, and communicates with the MFPs 20 and 40 and the SFP 30 via the external I/O 2012 and network 500. The RAM 2002 functions as a main memory, work area, and the like for the CPU 2001. The memory controller (MC) 2007 controls access to the external memory 2008.

FIG. 2B is a block diagram showing the control configuration of the SFP 30 according to the first embodiment. As shown in FIG. 2A, the MFP 10 comprises the scanner section 1000 and printer section 2000. Unlike the printer section 2000 shown in FIG. 2A, a printer section 3000 of the SFP 30 in FIG. 2B does not have a unit corresponding to the internal I/O 2006, and always receives image data to be printed from the network 500 via an external I/O 3012.

The printer section 3000 comprises an external memory 3008, printing unit 3010, operation unit (panel) 3011, and printer control unit 3100. The operation panel 3011 has various switches, an LED display, and the like to be operated by the user.

The printer control unit 3100 controls the entire print function of the SFP 30, and analyzes print information and the like supplied from an external apparatus. Further, the printer control unit 3100 converts a character pattern corresponding to character information into a video signal, and transmits the video signal to the printing unit 3010. The printer control unit 3100 comprises a CPU 3001, RAM 3002, program ROM 3003, data ROM 3004, memory controller (MC) 3007, printing unit interface (I/F) 3009, and external I/O 3012. These components are connected by a system bus 3013.

The CPU 3001 controls various devices connected to the system bus 3013 based on a control program stored in the program ROM 3003 to perform a process (to be described later), a control program stored in the external memory 3008, and the like. The CPU 3001 outputs an image signal to the printing unit 3010 connected via the printing unit interface 3009, and causes the printing unit 3010 to print. The data ROM 3004 stores charging counter information 3005 as log information of charged services executed by the SFP. The RAM 3002 functions as a main memory, work area, and the like for the CPU 3001. The memory controller (MC) 3007 controls access to the external memory 3008.

<Remote Copy Operation>

A remote copy operation as a feature of the first embodiment will be explained with reference to FIGS. 3A to 8. In the following remote copy, image data is read from the MFP 10 to perform remote copy output (printing) by the MFP 20.

Figure 3A:
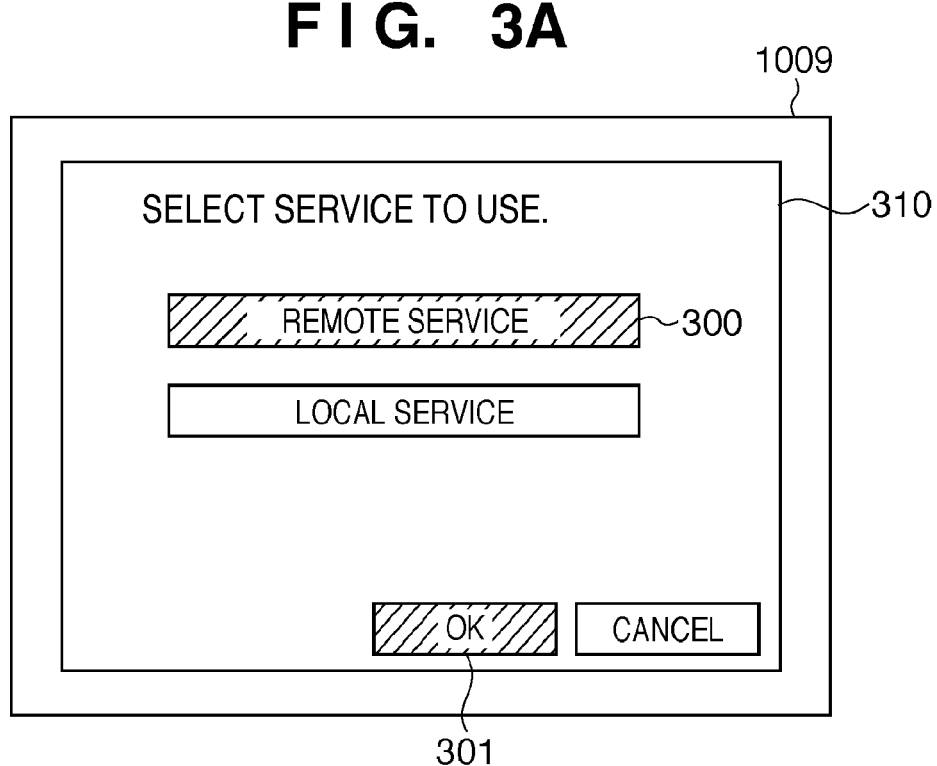
FIG. 3A is a view showing an operation mode input screen 310 on an operation unit 1009 of the MFP 10 according to the first embodiment.

FIG. 3A is a view showing an operation mode input screen 310 on the operation unit 1009 of the MFP 10 according to the first embodiment. The operation mode input screen 310 appears on the operation unit 1009 upon power-on. The operation mode input screen 310 displays an area for selecting a "remote service" operation as a job performed in cooperation with another network device, or a "local service" operation as a job performed by the operating device itself. This area is implemented by a soft key capable of selecting an operation by pressing it.

The first embodiment assumes a remote service operation to output data from another apparatus (the MFP 20 or 40 or the SFP 30) connected via the network 500. For this reason, the user presses a button 300 to select the "remote service", and then presses an OK button 301. Then, the CPU 1001 displays an ID input screen 320 shown in FIG. 3B on the operation unit 1009.

Figure 3B:
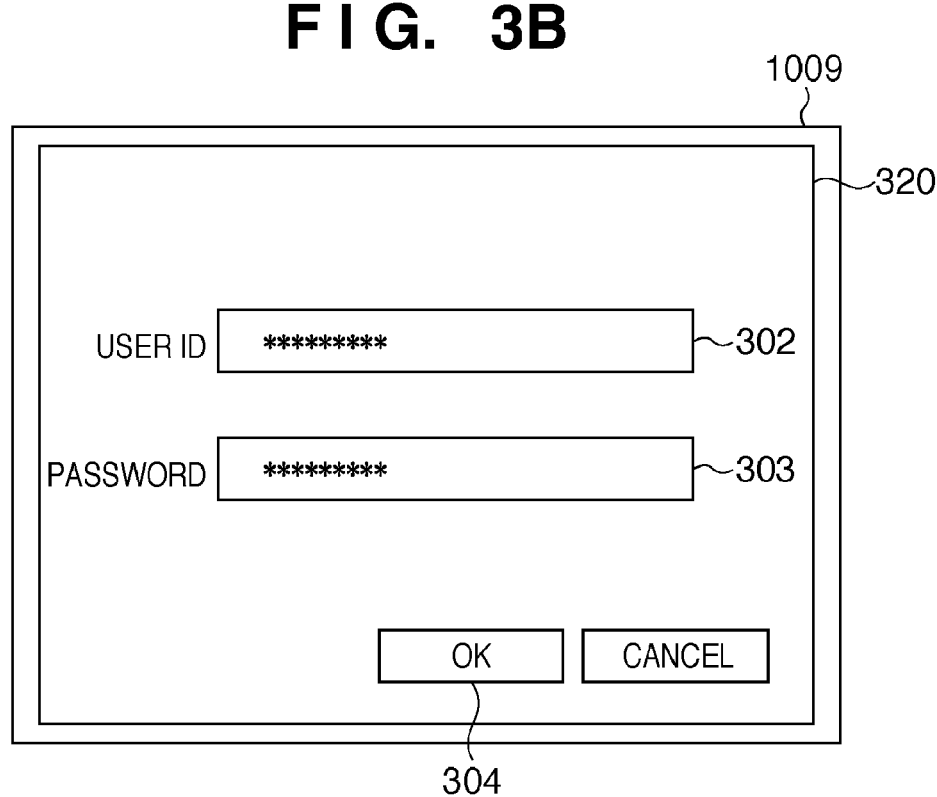
FIG. 3B is a view showing an ID input screen 320 on the operation unit 1009 of the MFP 10 according to the first embodiment.

FIG. 3B is a view showing the ID input screen 320 on the operation unit 1009 of the MFP 10 according to the first embodiment. When the user selects the "remote service" on the operation mode input screen 310, the ID input screen 320 appears. On the ID input screen 320, the user inputs pieces of information to a user ID area 302 and password input area 303 with a ten-key pad (not shown) on the operation unit 1009. When the user presses an OK button 304, an operation screen appears to allow operation. The user ID input area 302 and password input area 303 may also be switched by, e.g., directly pressing the input area. The CPU 1001 performs authentication by deciding whether the input user ID (ID information) and password coincide with those stored in the data ROM 1005 of the MFP 10. According to the first embodiment, however, if the data ROM 1005 of the MFP 10 stores neither a corresponding user ID nor password, the CPU 1001 requests another apparatus via the network 500 to perform authentication. More specifically, the CPU 1001 determines whether another apparatus connected to the network 500 stores a corresponding user ID and password. If all apparatuses on the network 500 store neither a corresponding user ID nor password, the CPU 1001 displays an error screen 330 shown in FIG. 3C in order to notify an unauthenticated user of a failure in authentication.

Figure 3C:
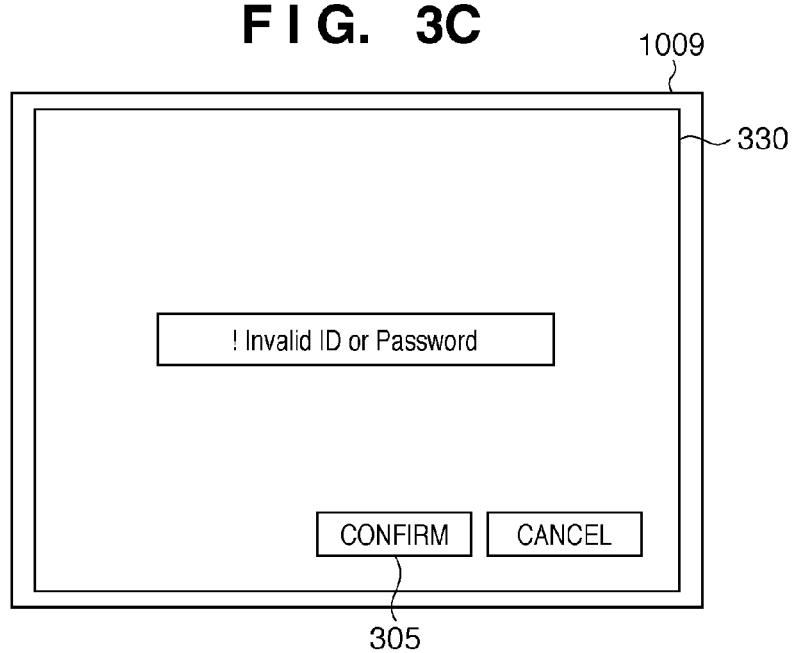
FIG. 3C is a view showing an error screen 330 on the operation unit 1009 of the MFP 10 according to the first embodiment.

FIG. 3C is a view showing the error screen 330 on the operation unit 1009 of the MFP 10 according to the first embodiment. When an input user ID or password is erroneous or an input user ID does not coincide with user IDs registered in all apparatuses arranged on the network 500, as described above, the CPU 1001 displays the error screen 330 on the operation unit 1009. The error screen 330 displays, e.g., a message "Invalid ID or Password". In this case, the user may also change the display to the ID input screen 320 again by pressing a confirmation key 305.

Figure 4:
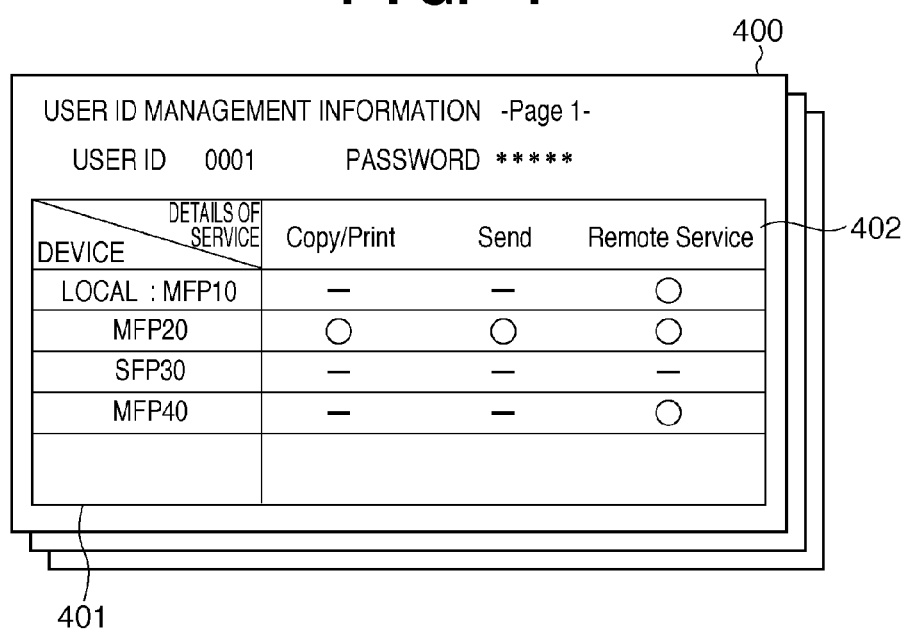
FIG. 4 is a view for explaining ID authorization information 400 according to the first embodiment.

FIG. 4 is a view for explaining ID authorization information 400 according to the first embodiment. The image processing system 100 holds the ID authorization information (user ID management information) 400 serving as charged service information of each device for each user ID. For example, the data ROM 1005 of the MFP 10 manages the ID authorization information 400. The data ROMs of the remaining MFPs 20 and 40 and SFP 30 also manage the ID authorization information 400.

As shown in FIG. 4, the ID authorization information 400 is managed for each user ID, and holds charged services 402 permitted by a local device (the MFP 10 in this case) and other devices (the MFP 20, SFP 30, and MFP 40 in this case) via the network 500. As shown in FIG. 4, the charged services include a copy/print function (Copy/Print), send function (Send), and remote copy function (Remote Service).

More specifically, the ID authorization information 400 holds restriction information of the charged services 402 for each device type 401. In FIG. 4, "○" represents that a corresponding charged service 402 is permitted. In FIG. 4, "–" represents that a corresponding charged service 402 is prohibited. For the user ID shown in FIG. 4, the MFP 10 serving as a local device, and the MFP 40, permit the remote copy service. The MFP 20 permits all services. The SFP 30 prohibits all services. Each apparatus restricts the use of the image processing system 100 by the user based on the ID authorization information 400.

FIG. 5A is a view showing an operation screen 510 displayed after user authentication according to the first embodiment. Only a part associated with the present invention will be described below. The operation screen 510 displays a logout key 509, and remote service keys 501, 502, 503, and 504.

The logout key 509 is used when the user logs out of the log-in state after authentication. The remote service keys 501 to 504 are soft keys displayed on the touch panel to execute respective remote services (charged services). When the user presses the remote service key 501, remote copy is executed. Similarly, when the user presses the remote service key 502, the facsimile function is executed. When the user presses the remote service key 503, a scanned image is sent. When the user presses the remote service key 504, a scanned image is saved.

Figure 5B:
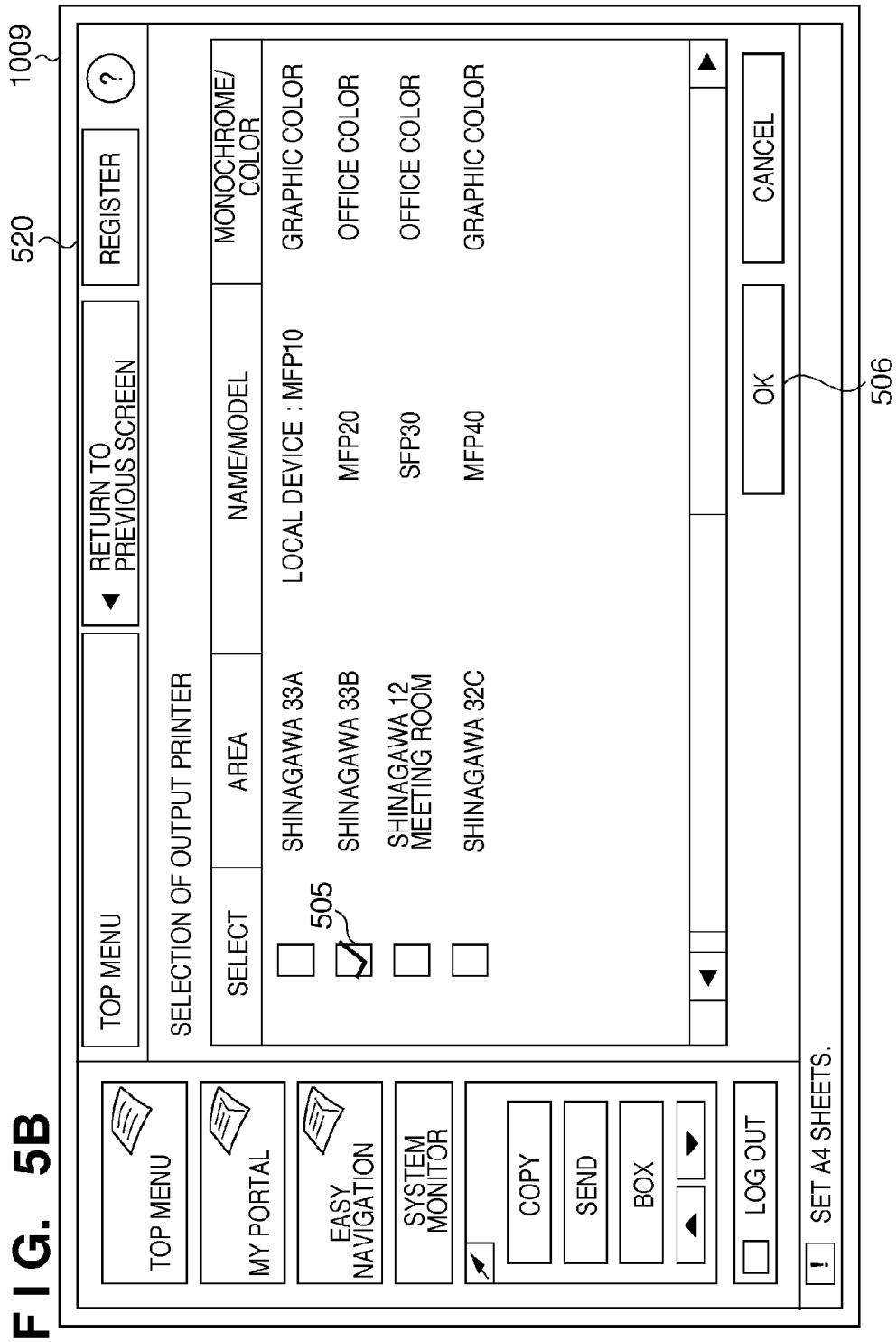
FIG. 5B is a view showing a selection screen 520 displayed when remote copy is selected according to the first embodiment.

When the user selects the remote service key 501, the CPU 1001 displays a selection screen 520 shown in FIG. 5B on the operation unit 1009. FIG. 5B is a view showing the selection screen 520 displayed when remote copy is selected. As shown in FIG. 5B, the selection screen 520 displays a list of printers serving as output destination candidates. When the user selects remote copy on the operation screen 510, the CPU 1001 may also display, on the selection screen 520, only outputtable printers stored in the ID authorization information 400 corresponding to the user ID. The CPU 1001 may also display all the devices of the network 500, and if the user selects a device which prohibits remote copy, display a warning such as "this device cannot execute the service."

As shown in FIG. 5B, the selection screen 520 displays an area, device name, printing mode, and the like, and further displays a selection button 505 for each device and an OK button 506. The user can select an output printer by pressing the selection button 505, and decide it by pressing the OK button 506.

Charging control to set in advance a count enable command (count increment instruction) in order to control a charging log counter at the end of the copying operation when the user selects the "MFP 20", as shown in FIG. 5B, will be explained.

Figure 6:
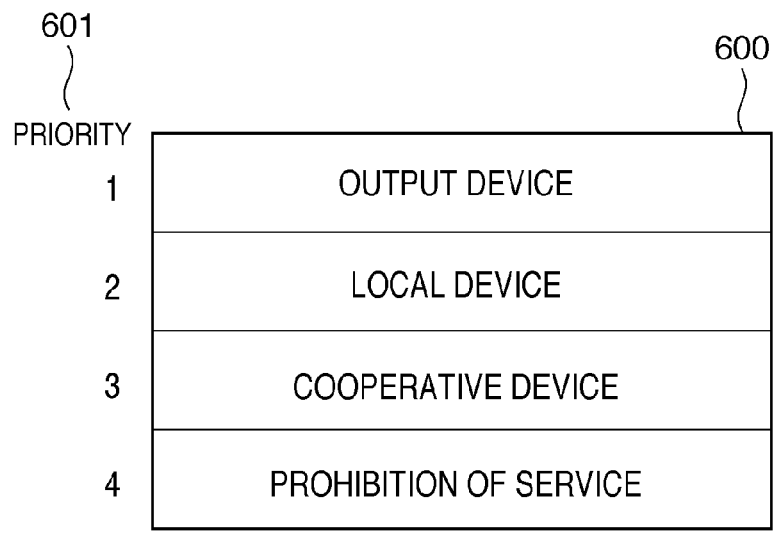
FIG. 6 is a table showing the contents of a priority table 600 according to the first embodiment.

When the "MFP 20" is set, the CPU 1001 checks the priority table 1006 stored in the data ROM 1005. FIG. 6 is a table showing the contents of a priority table 600 according to the first embodiment. As shown in FIG. 6, the first embodiment prioritizes and sets charged targets in advance.

The priority table 600 stores device types in the order of priority 601. The priority table 600 is used to decide a charging device after the end of a service. In this case, the smaller the priority number is, the higher the priority is. The priority 601 shown in FIG. 6 becomes lower in the order of an output device (printer which executes printing), a local device (printer which inputs image data to be printed), a cooperative device (another printer connected to the network 500, also called a network device), and prohibition of a service. More specifically, the CPU 1001 determines whether an output device (the MFP 20 in this case) having top priority has user ID authorization. More specifically, the CPU 1001 determines whether the data ROM of the MFP 20 holds the user ID of the user. If the MFP 20 does not have user ID authorization, the CPU 1001 determines whether a local device having second highest priority has user ID authorization. Even if both the output device and local device have user ID authorization, only one device can perform the following charging control in accordance with the priority, preventing double charging and the like. When the priority table 600 is held, the priority of a charged device can also be easily changed by changing the priority table 600.

From the ID authorization information 400 shown in FIG. 4, the CPU 1001 decides that the charging destination is the MFP 20. After deciding the charging device, the CPU 1001 sets the IP address of an output printer and a count enable command in the charging setting buffer 1003 based on the priority table 1006.

Figure 7:
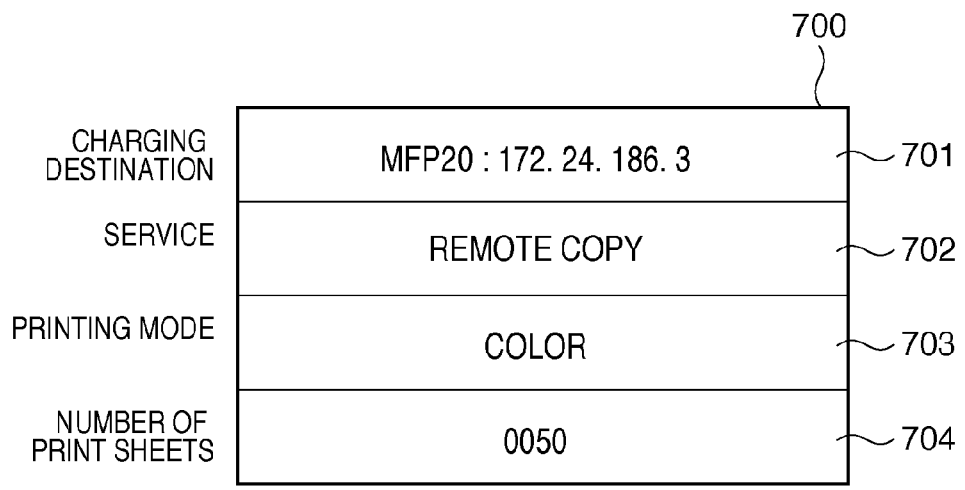
FIG. 7 is a view showing internal information of a charging setting buffer 700 according to the first embodiment.

FIG. 7 is a view showing internal information of a charging setting buffer 700 according to the first embodiment. As shown in FIG. 7, the charging setting buffer 700 has information on an IP address 701 of the charging destination, a service content 702, a printing mode 703 representing, e.g., color printing or monochrome printing, and a number 704 of print sheets to be printed. After the user sets the number of prints, the number 704 of print sheets is updated and stored. At the end of a copying operation, information stored in the buffer is transmitted together with a charging counter enable command from the charging setting buffer 700 to a device set as a transmission destination. As a result, charging counter information on the receiving side can be properly updated to store charging information.

Figure 5C:
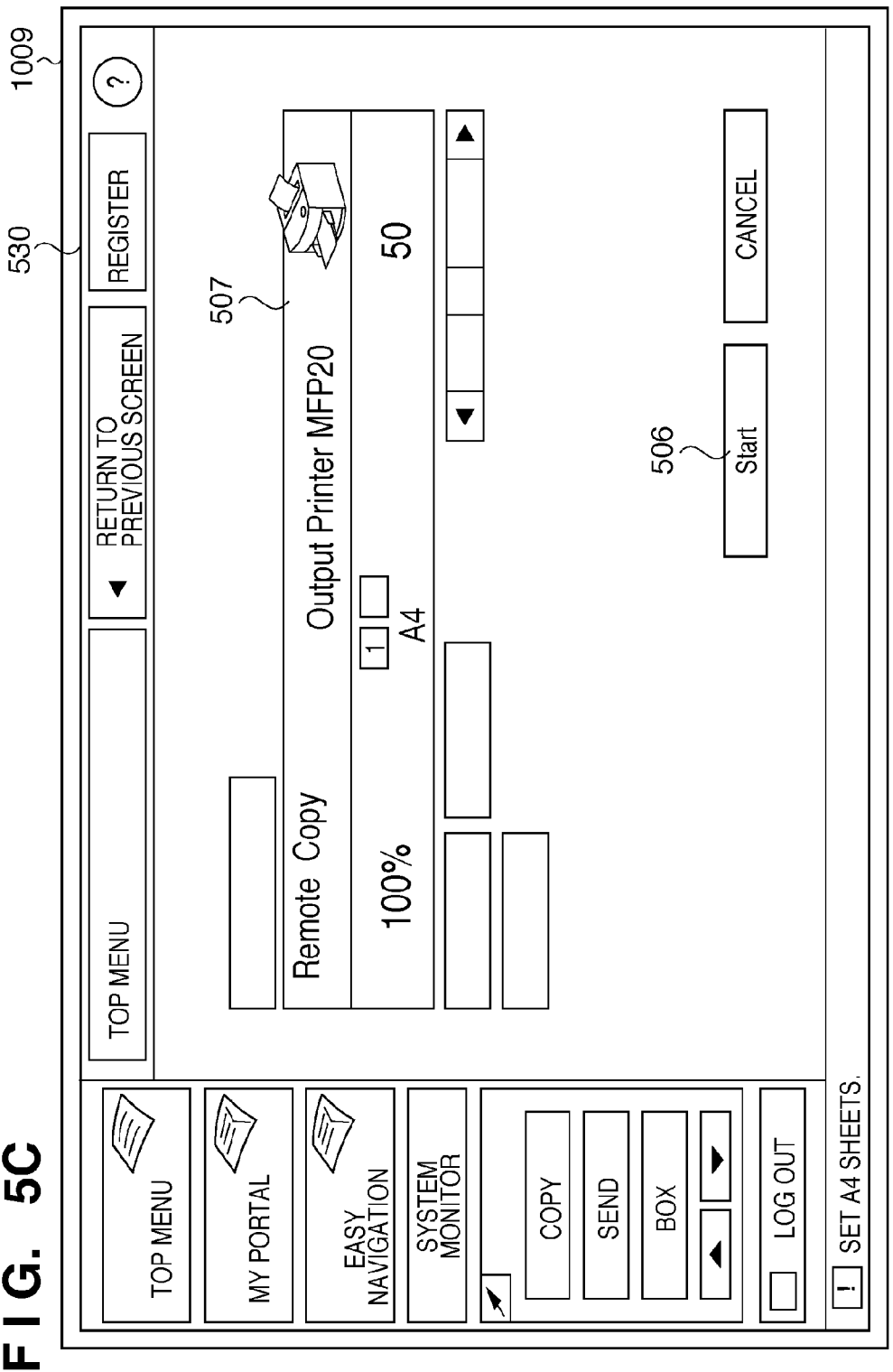
FIG. 5C is a view showing a confirmation screen 530 for executing a remote service according to the first embodiment.

In this manner, the user completes setting of the output printer, and a predetermined count enable command is set in the charging setting buffer 1003 of the MFP 10. Then, the CPU 1001 displays a confirmation screen 530 shown in FIG. 5C on the operation unit 1009. FIG. 5C is a view showing the confirmation screen 530 for executing a remote service. The confirmation screen 530 displays an "Output Printer MFP 20" display 507 representing that the "MFP 20" has been selected, and a Start key 508.

After the user selects a printer for remote copy and presses the Start key 508, the CPU 1001 instructs the scanner section 1000 to scan an original, and transmits the image data to the printer section 2000 of the designated MFP 20 via the external I/O 2012. The MFP 20 prints in accordance with the received image data. After the end of printing, the MFP 20 notifies the scanner section 1000 of the MFP 10 via the network 500 of a copy end command representing that the remote copy operation has ended. Then, the scanner section 1000 transmits a count enable command to the MFP 20 serving as an output device in accordance with information in the charging setting buffer 1003 set in advance. The MFP 20 receives the count enable command via the external I/O 2012, and increments, by the number of output print sheets, a counter held in the charging counter information in the printer section.

If an error occurs owing to a paper jam or the like during remote copy and the copy operation is interrupted, the MFP 20 transmits error information to the MFP 10 via the external I/O and network 500. Upon receiving the error information, the CPU 1001 displays abnormal termination of remote copy on the operation unit 1009. In this case, information of the count enable command stored in the charging setting buffer 1003 before executing the remote copy operation is desirably maintained in order to transmit the count enable command to the MFP 20 similarly when the user executes the remote copy operation again and the operation normally terminates. If the user cancels the job of the remote copy operation, the CPU 1001 clears the count enable information saved in the charging setting buffer 1003.

Figure 8:
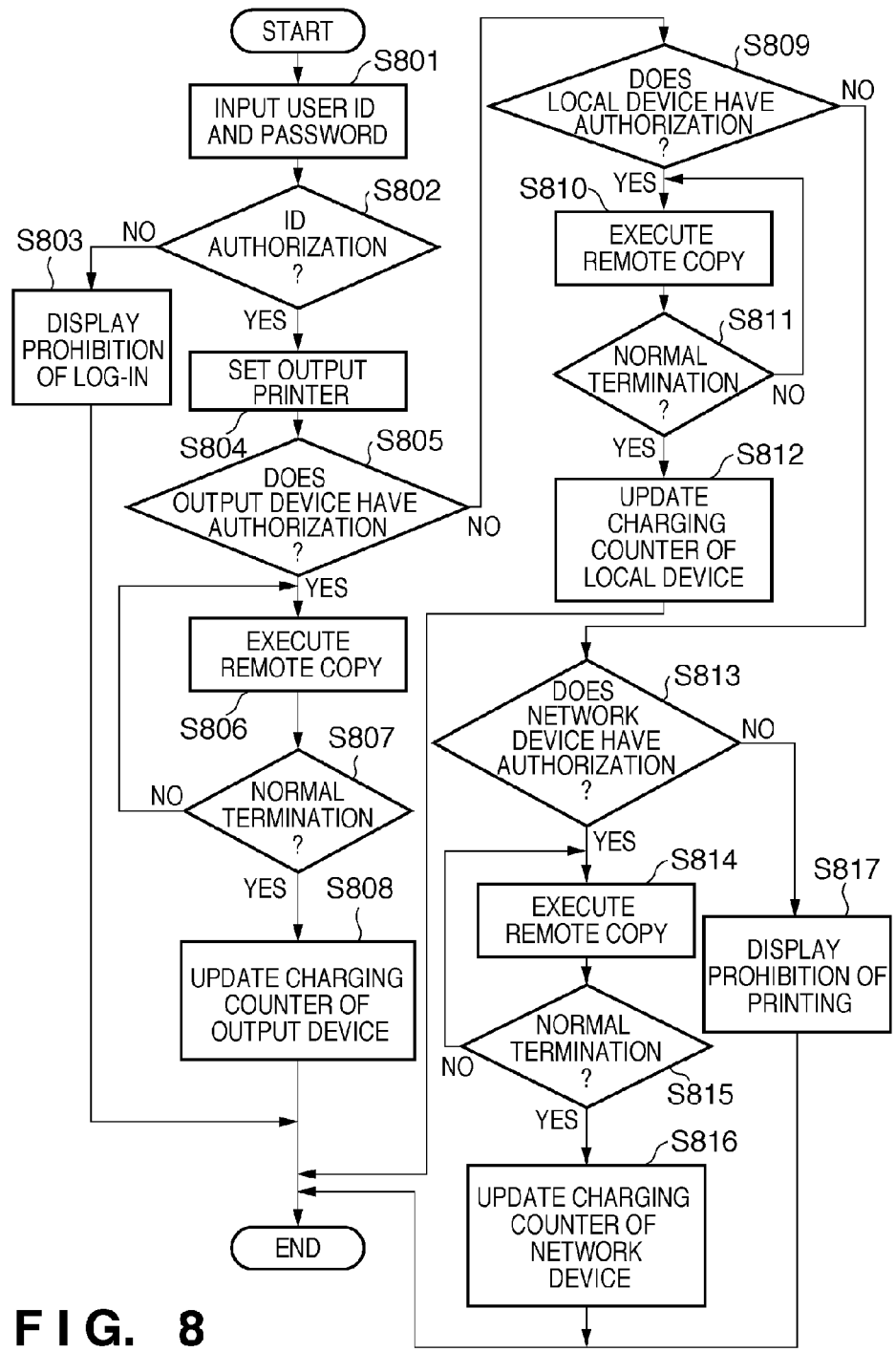
FIG. 8 is a flowchart showing the process procedures of a remote copy service according to the first embodiment.

A series of process procedures of the remote copy service will be explained with reference to FIG. 8. FIG. 8 is a flowchart showing the process procedures of the remote copy service according to the first embodiment. The following process assumes that the user selects remote copy on the operation screen 510. The following sequence shows process procedures according to the priority table 600.

In step S801, the CPU 1001 acquires a user ID and password input by the user from the operation unit 1009. In step S802, the CPU 1001 functions as an authentication unit to perform user authentication by determining whether the acquired user ID is stored in advance in the data ROM 1005. If the input user ID is not stored in the data ROM 1005, the CPU 1001 determines whether the user ID is stored in other printers (the MFPs 20 and 40 and the SFP 30 in this case) connected via the network 500. More specifically, the CPU 1001 functions as a transmission unit to transmit the input user ID to other printers via the network 500. The CPU 1001 of each printer functions as a reply unit to determine whether the transmitted user ID is stored in the data ROM 1005 of this printer, and to reply the determination result to the user ID-transmitting printer. In the image processing system 100 according to the first embodiment, even if a printer used by the user does not store his user ID, authentication is done by the system as a whole by determining whether another printer in the system stores the user ID. If the input user ID is not stored in the entire system (NO in step S802), the CPU 1001 shifts the process to step S803. In step S803, the CPU 1001 displays the error screen 330 on the operation unit 1009 to notify the user that log-in is prohibited, and ends the process. At this time, the CPU 1001 functions as a prohibition unit.

If the authentication is successful (YES in step S802), the CPU 1001 sets in step S804 an output printer for executing printing. More specifically, the CPU 1001 generates the selection screen 520 by using charged service information stored in the data ROM 1005, and displays the selection screen 520 on the operation unit 1009 to prompt the user to select an output printer. At this time, the CPU 1001 functions as a display control unit. From information input by the user to the input device of the operation unit 1009 via the selection screen 520, the CPU 1001 selects a printer for executing printing. The information input to the input device is, for example, information representing that the user has selected the selection button 505 displayed on the selection screen 520 of FIG. 5B. The CPU 1001 also functions as an output destination selection unit.

After the user selects a printer for executing printing, the CPU 1001 decides a printer for storing charging information. In step S805, the CPU 1001 determines, from ID authorization information stored in the data ROM 1005, whether the output device (printer selected in step S804) permits a charged service for a corresponding user ID. The reason to determine whether the output device permits a charged service is that top priority is set in the priority table 600. Hence, the CPU 1001 acquires the priority table 600 and ID authorization information from the data ROM 1005, and decides the order of determination. If the output device permits the charged service (YES in step S805), the CPU 1001 shifts the process to S806; if NO, the process advances to step S809.

In step S806, the CPU 1001 determines that the output device is to store charging information, and executes remote copy. More specifically, the CPU 1001 reads image data from an original by the scanner 1008, and transmits the read image data to the output device via the network 500. The printer on the output side prints in accordance with the received image data. If printing normally terminates, the printer on the output side transmits a notification representing the normal termination to the printer on the image data reading side. If printing abnormally terminates, the printer on the output side may also transmit a notification representing the abnormal termination to the printer on the reading side. After deciding a printer for executing printing and a printer for storing charging information, the CPU 1001 sets the IP address of the output device and a set sheet count in the charging setting buffer 1003.

In step S807, the CPU 1001 determines whether printing has normally terminated by determining whether a notification representing the normal termination has been transmitted. If the CPU 1001 determines that printing has abnormally terminated, it shifts the process to step S806, and executes printing again. If the CPU 1001 determines that printing has normally terminated, it shifts the process to step S808.

In step S808, the CPU 1001 transmits charging information representing the contents of executed printing to the output device determined in S805 to store charging information, thereby causing the output device to store charging information. More specifically, the CPU 1001 transmits the contents set in the charging setting buffer 1003 to the printer for storing charging information. At this time, the CPU 1001 functions as a charging information storage unit. The printer for storing charging information updates the charging counter information 2005 stored in the data ROM 2004 in accordance with the received information.

If the CPU 1001 determines in step S805 that the output device prohibits the charged service, it determines in step S809 whether the local device permits the charged service. The local device means a printer which reads image data to be printed. In this case, the local device is a printer in which the CPU 1001 resides. If the local device permits the charged service (YES in step S809), the CPU 1001 shifts the process to step S810; if NO, the process advances to step S813.

In step S810, the CPU 1001 determines that the local device is to store charging information, and executes remote copy. More specifically, the CPU 1001 reads image data from an original by the scanner 1008, and transmits the read image data to the output device via the network 500. The printer on the output side prints in accordance with the received image data. If printing normally terminates, the printer on the output side transmits a notification representing the normal termination to the printer on the image data reading side. If printing abnormally terminates, the printer on the output side may also transmit a notification representing the abnormal termination to the printer on the reading side. After deciding a printer for executing printing and a printer for storing charging information, the CPU 1001 sets the IP address of the output device and a set sheet count in the charging setting buffer 1003.

In step S811, the CPU 1001 determines whether printing has normally terminated by determining whether a notification representing the normal termination has been transmitted. If the CPU 1001 determines that printing has abnormally terminated, it shifts the process to S810, and executes printing again. If the CPU 1001 determines that printing has normally terminated, it shifts the process to S812.

In step S812, the CPU 1001 transmits charging information representing the contents of executed printing to the local device determined in step S809 to store charging information, thereby causing the local device to store charging information. Since the local device is a printer in which the CPU 1001 resides, the CPU 1001 updates the charging counter information 2005 stored in the data ROM 2004 of this printer, unlike in step S808.

If the CPU 1001 determines in step S809 that the local device prohibits the charged service, it determines in step S813 whether a network device permits the charged service. The network device means a printer connected to the network 500 other than a printer for executing printing and a printer for reading image data to be printed. If the network device permits the charged service (YES in step S813), the CPU 1001 shifts the process to step S814; if NO, the process advances to step S817.

In step S814, the CPU 1001 determines that the network device stores charging information, and executes remote copy. More specifically, the CPU 1001 reads image data from an original by the scanner 1008, and transmits the read image data to the output device via the network 500. The printer on the output side prints in accordance with the received image data. If printing normally terminates, the printer on the output side transmits a notification representing the normal termination to the printer on the image data reading side. If printing abnormally terminates, the printer on the output side may also transmit a notification representing the abnormal termination to the printer on the reading side. After deciding a printer for executing printing and a printer for storing charging information, the CPU 1001 sets the IP address of the output device and a set sheet count in the charging setting buffer 1003.

In step S815, the CPU 1001 determines whether printing has normally terminated by determining whether a notification representing the normal termination has been transmitted. If the CPU 1001 determines that printing has abnormally terminated, it shifts the process to step S814, and executes printing again. If the CPU 1001 determines that printing has normally terminated, it shifts the process to step S816.

In step S816, the CPU 1001 transmits charging information representing the contents of executed printing to the network device determined in step S813 to store charging information, thereby causing the network device to store charging information. More specifically, the CPU 1001 transmits the contents set in the charging setting buffer 1003 to the printer for storing charging information. At this time, the CPU 1001 functions as a charging information storage unit. The printer for storing charging information updates the charging counter information 2005 stored in the data ROM 2004 of this printer in accordance with the received information.

If the CPU 1001 determines in step S813 that a printer which permits the charged service does not exist among network devices, it displays on the operation unit 1009 in step S817 information that the user does not have the authorization, and ends the process. That is, the CPU 1001 determines that no printers can execute the charged service. Hence, the CPU 1001 prohibits printing and ends the process.

As described above, the image processing system according to the first embodiment selects an image processing apparatus for storing charging information of image forming by using charged service information and the priority table which are stored in advance. More specifically, the image processing system selects an image processing apparatus which permits a charged service and has top priority as an image processing apparatus for storing charging information. Even for remote copy executed using any image processing apparatus, an image processing apparatus for storing charging information can be selected in accordance with the priority defined in the image processing system, and proper charging information can be stored. Since charged service information is set for each user ID, charging information can be appropriately stored regardless of the user who has used a charged service. Even if another department or an outside user uses a charged service, proper charging information can be stored for each user ID in accordance with the priority. The image processing system can solve the problem that the administrator pays the charge of a copy service used by another department or an outside user, and can correctly charge a user who has used a service.

The present invention is not limited to the above-described embodiment, and various modifications can be made. For example, the image processing system causes the device of a user to execute user authentication. If the authentication fails, authentication is done by another device in the system. Even when a device having no user ID authorization performs remote copy, authentication can be done by the system as a whole, providing a user-friendly operation system.

Second Embodiment

The second embodiment will be described with reference to FIGS. 9 to 10C. A feature of the second embodiment is the use of an ID card (IC card) for user authentication. The basic configuration of an image processing system 100 according to the second embodiment is the same as that in the first embodiment. Only differences between the first and second embodiments will be described below. The same reference numerals denote the same parts, and a description thereof will not be repeated.

Figure 9:
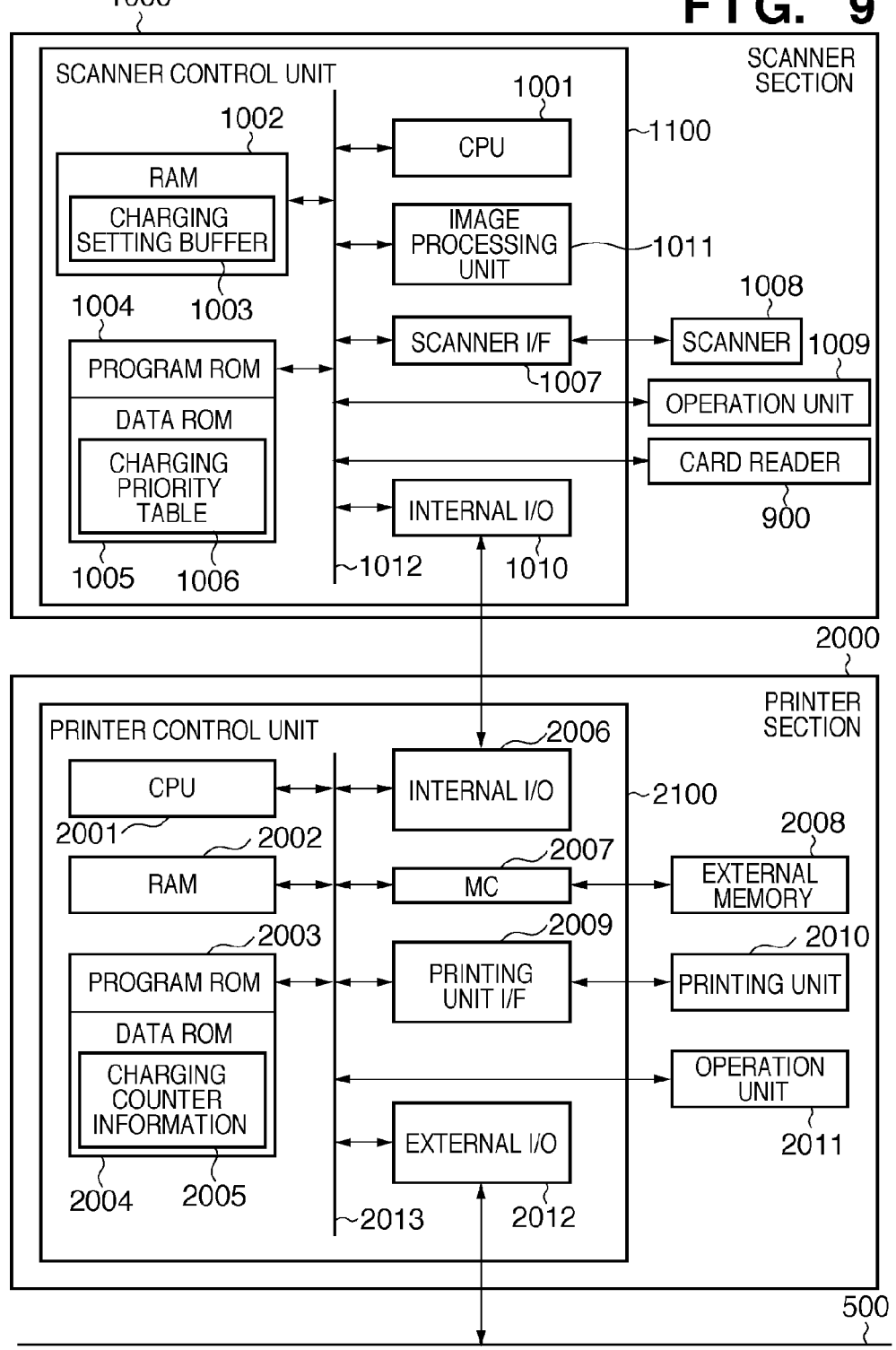
FIG. 9 is a block diagram showing the control configuration of an MFP 20 according to the second embodiment.
Figure 10A:
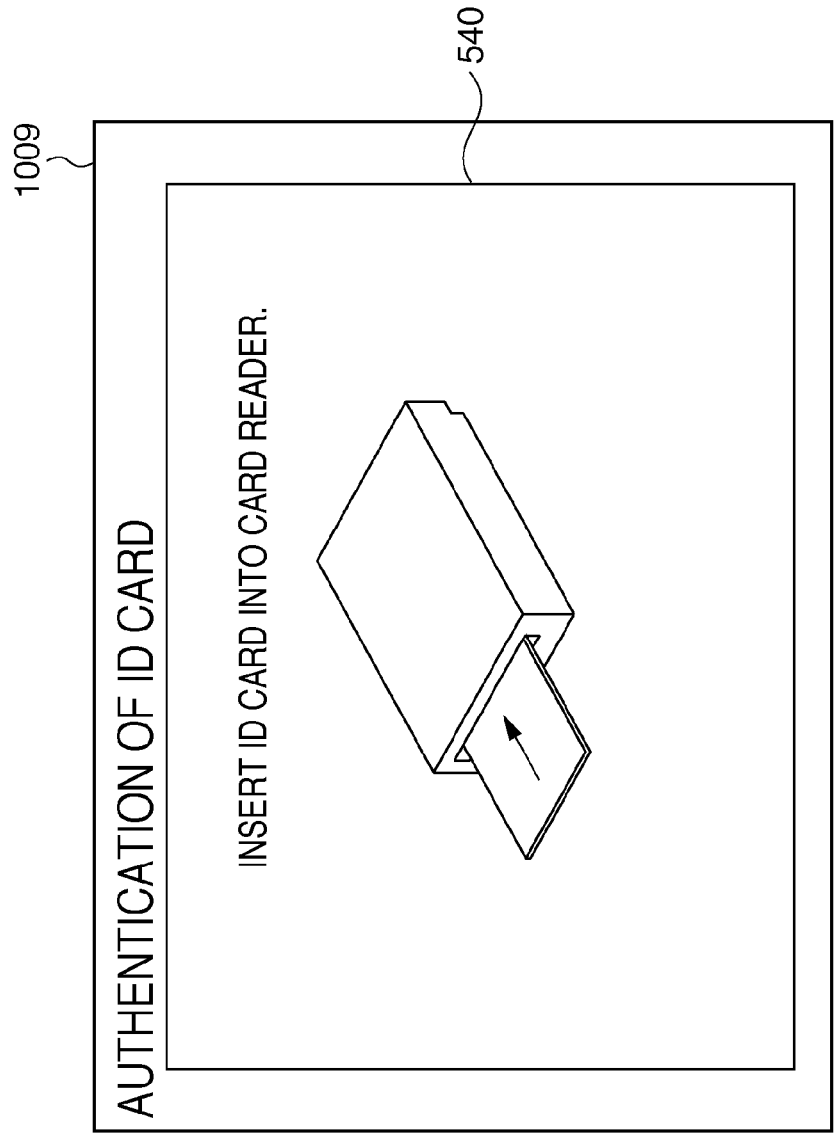
FIG. 10A is a view showing an ID card authentication screen 540 according to the second embodiment.

FIG. 9 is a block diagram showing the control configuration of an MFP 20 according to the second embodiment. FIG. 10A is a view showing an ID card authentication screen 540 according to the second embodiment. FIG. 10B is a view showing a retrieval screen 550 according to the second embodiment. FIG. 10C is a view showing a retrieval result screen 560 according to the second embodiment.

The MFP 20 comprises a card reader 900 in addition to the configuration shown in FIG. 2A. The card reader 900 reads out information from an inserted ID card. The ID card has at least user ID information and password information. The user can execute authentication by inserting the ID card storing ID information into the card reader 900. When the ID card is inserted, the card reader 900 reads out ID information from the ID card, and notifies a scanner section 1000 of it.

A remote copy operation according to the second embodiment will be explained. An example of reading image data from the MFP 20 and performing a remote copy output from an SFP 30 will be explained. Unlike the first embodiment, the second embodiment assumes that a reading device does not store ID authorization information corresponding to a user ID read out from an ID card.

Similar to FIG. 3A in the first embodiment, a CPU 1001 displays an operation mode input screen 310 on an operation unit 1009 upon power-on. Since the case assumed in the second embodiment is a remote service operation, the user presses a button 300 and then an OK button 301.

After the user presses the OK button 301, the CPU 1001 displays the ID card authentication screen 540 shown in FIG. 10A on the operation unit 1009. The ID card authentication screen 540 appears to prompt the user to insert an ID card into the card reader 900 attached to the MFP 20. After the user inserts the ID card, the card reader 900 reads a user ID and password information held in the ID card. The CPU 1001 stores the read user ID and password in a RAM 1002. Subsequently, the CPU 1001 performs authentication using the read user ID and password.

If the authentication is successful, the CPU 1001 displays an operation screen 510 shown in FIG. 5A on the operation unit 1009. At this time, the user selects remote copy. In the case assumed in the second embodiment, unlike the first embodiment, the MFP 20 does not store in advance ID authorization information of a charged service by each device for each user ID. Thus, the CPU 1001 distributes the user ID and password read out from the ID card to cooperative devices via a network 500, and retrieves a printer capable of remote copy. At this time, the CPU 1001 displays the retrieval screen 550 shown in FIG. 10B on the operation unit 1009.

Each printer checks ID authorization information for the notified user ID, determines whether the printer permits remote copy, and notifies the determination result. In this case, the CPU 1001 may also additionally display output devices on the retrieval screen 550 in the order they are retrieved, at any time.

After output devices are retrieved, the CPU 1001 displays the retrieval result screen 560 in FIG. 10C. The user selects an output device with a selection button 800, and presses an OK button 801 to execute remote copy. Charging control when the "SFP 30" is selected as shown in FIG. 10C will be explained in detail.

When the user selects the "SFP 30", the CPU 1001 of the MFP 20 collates priority set in a priority table 1006 with ID authorization information 400 corresponding to the user ID, and selects a printer for storing charging information. Since the selected output device is the SFP, no ID authorization information 400 is managed. Hence, the ID authorization information 400 of the local device (transmission device) having second highest is checked in accordance with the priority in the priority table.

The local device (MFP 20) manages ID authorization information, the user is authorized to execute copying/printing, and thus the CPU 1001 sets the IP address of the MFP 20 and a count enable command in a charging setting buffer 1003. After setting an output printer and a printer for storing charging information, the CPU 1001 displays a confirmation screen 530 shown in FIG. 5C on the operation unit 1009, similar to the first embodiment. A window 507 displays "Output Printer SFP 30". When the user presses a Start key 508, the scanner section 1000 of the MFP 20 scans an original to transmit the scanned image data to the SFP 30 via the network 500. The SFP 30 prints in accordance with the received image data.

After the end of printing, the SFP 30 notifies the MFP 20 via the network 500 of a copy end command representing that remote copy has ended. The CPU 1001 transmits a count enable command to a printer section 2000 of the MFP 20 together with information in the charging setting buffer 1003. In response to this, the counter of charging counter information 2005 in a data ROM 2004 of the printer section 2000 is incremented by a predetermined number of print sheets. Similar to the first embodiment, if an error such as a paper jam occurs in the SFP 30, the CPU 1001 displays an error screen 330 on the operation unit 1009.

Another Embodiment

Another embodiment will be described. The configuration of an image processing system 100 according to this embodiment is the same as that in FIG. 1 in the first embodiment, the internal configuration is also the same as those in FIGS. 2A and 2B, and a description thereof will not be repeated. A remote copy operation when reading an image from an MFP 10 and outputting it from an SFP 30 will be explained. That is, this embodiment assumes a case where neither an input device nor output device has authorization information and copy authorization corresponding to an input user ID.

Similar to the first embodiment, this embodiment also assumes a remote service operation to print by the SFP 30 connected via a network 500. Thus, the user presses a button 300 and then an OK button 301 on an operation mode input screen 310. After that, the user similarly inputs a user ID and password on an ID input screen 320.

Similar to the first embodiment, authentication is done based on the contents of the user ID and password managed in a data ROM 1005 of the MFP 10. If the authentication is successful, the user logs in to an operation screen 510, and selects a desired service via the operation screen 510. Then, a CPU 1001 displays a selection screen 520 to prompt the user to select an output destination. In this case, the user selects the SFP 30 as an output printer.

After the user selects the "SFP 30", the CPU 1001 collates priority set in a priority table 1006 with ID authorization information 400 corresponding to the user ID, and selects a printer for storing charging information. In this embodiment, the selected output device is the SFP 30, and no ID authorization information 400 is managed, as shown in FIG. 4. Hence, the ID authorization information 400 of the local device (transmission device) having second highest is checked in accordance with the priority in the priority table 1006. However, the local device is not authorized to execute copying/printing corresponding to the input user ID. For this reason, the ID authorization information 400 of a cooperative device having the third priority is checked. In this case, an MFP 20 is authorized to execute copying/printing for the input user ID. Thus, the CPU 1001 sets the IP address of the MFP 20 and a count enable command in a charging setting buffer 1003.

After deciding an output device and charging device, the CPU 1001 causes a scanner section 1000 to scan an original in response to press of a Start key 508, and transmits the image data to the SFP 30 via the network 500. Upon receiving the image data, the SFP 30 prints. After the end of printing, the SFP 30 notifies the MFP 10 of a copy end command representing that the remote copy operation has ended. Then, the CPU 1001 transmits information set in the charging setting buffer 1003 to a printer section 2000 of an MFP 20 together with a count enable command. The printer section 2000 of the MFP 20 increments, by a predetermined number of sheets, a counter held in charging counter information 2005.

Various embodiments have been described in detail. The present invention may also be applied to a system including a plurality of devices or an apparatus formed by a single device. For example, the present invention may also be applied to a computer system including a printer, facsimile apparatus, PC, server, and client.

The present invention is also achieved by supplying a software program for implementing the functions of the above-described embodiments to a system or apparatus directly or from a remote location, and reading out and executing the supplied program codes by the computer of the system or the like.

Hence, the program codes installed in the computer to implement the functions and processes of the present invention also implement the present invention. That is, the present invention also includes the computer program for implementing the functions and processes.

In this case, the program may take the form of an object code, a program executed by an interpreter, or script data supplied to an OS as long as the functions of the program can be provided.

Examples of the recording medium for supplying the program are a flexible disk, hard disk, optical disk, magneto-optical disk, MO, CD-ROM, CD-R, and CD-RW. Other examples of the recording medium are a magnetic tape, non-volatile memory card, ROM, and DVD (DVD-ROM and DVD-R).

The program may also be downloaded from an Internet homepage by using the browser of a client computer. That is, the computer program of the present invention or a compressed file containing an automatic installing function may also be downloaded from the homepage to a recording medium such as a hard disk. The program can also be supplied by grouping program codes which form the program of the present invention into a plurality of files, and downloading the files from different homepages. That is, a WWW server which allows a plurality of users to download the program files for implementing the functions and processes of the present invention by a computer is also a constituent feature of the present invention.

It is also possible to encrypt the program of the present invention, store the encrypted program in a storage medium such as a CD-ROM, and distribute the storage medium to users. In this case, only a user who satisfies a predetermined condition can download decryption key information from a homepage via the Internet. The user can decrypt and execute the encrypted program using the key information, and install it in a computer.

Further, the functions of the above-described embodiments may also be implemented when the computer executes the readout program. An OS or the like running on the computer may also perform some or all of actual processes on the basis of the instructions of the program. Also in this case, the functions of the above-described embodiments can be implemented.

The program read out from the recording medium may also be written in the memory of a function expansion board inserted into the computer or the memory of a function expansion unit connected to the computer. Based on the instructions of the program, the CPU of the function expansion board or function expansion unit may also perform some or all of actual processes. In this way, the functions of the above-described embodiments may also be implemented.

The present invention can provide an image processing system capable of properly charging a user even when image processing apparatuses in the system cooperate with each other, and a control method therefor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-226698 filed on Aug. 31, 2007, which is hereby incorporated by reference herein in its entirety.

What is claimed is:

1. An image processing system in which a plurality of image processing apparatuses are connected via a network and cooperate to execute image forming using a printing material, the system comprising:
a storage unit configured to store service information representing whether each of the plurality of image processing apparatuses permits counting usage of the printing materials in order to allow charging of service for providing the image forming associated with each user identification information, and a priority table indicating a priority for the plurality of image processing apparatuses that execute printing, wherein an image processing apparatus that inputs image data to be printed has a higher priority than a local image processing apparatus or a cooperating image processing apparatus;
a counting destination selection unit configured to select, as an image processing apparatus for storing count information by using the service information and the priority table corresponding to the user identification information, an image processing apparatus which permits the service and has the higher priority; and
a count information storage unit configured to, when the plurality of image processing apparatuses cooperate to execute image forming, cause the selected image processing apparatus to store the count information by transmitting the count information to the selected image processing apparatus.

2. The system according to claim 1, wherein the storage unit is further configured to store the user identification information and a password, the image processing system further comprising:
an authentication unit configured to perform authentication by determining whether the storage unit stores the user identification information and the password input via an input device of the image processing apparatus;
a display control unit configured to generate and display, by using the service information corresponding to the user identification information, a selection screen for selecting an image processing apparatus for executing the image forming; and
an output destination selection unit configured to select, from information input to the input device via the selection screen, an image processing apparatus for executing the image forming, wherein the counting destination selection unit selects the image processing apparatus for storing the count information by using information of an image processing apparatus that inputs image data subjected to image forming and information of the image processing apparatus selected by the output destination selection unit in addition to the service information and the priority table.

3. The system according to claim 2, wherein when the storage unit does not store the input user identification information, the authentication unit performs authentication by determining whether a storage unit of another image processing apparatus connected via the network stores the user identification information.

4. The system according to claim 2, wherein the authentication unit comprises a transmission unit configured to, when the storage unit does not store the input user identification information, transmit the user identification information to another image processing apparatus connected via the network, and the another image processing apparatus further comprises a reply unit configured to determine whether the storage unit of the another image processing apparatus stores the transmitted user identification information, and reply a determination result to an image processing apparatus which has transmitted the user identification information.

5. The system according to claim 3, further comprising a prohibition unit configured to prohibit the image forming when the authentication fails or when an image processing apparatus for storing charging information does not exist.

6. The system according to claim 2, further comprising a reading unit configured to read out information of an IC card which stores the user identification information and the password.

7. The system according to claim 1, wherein the count information includes at least a type of mode of the image forming, a type of the printing material used in the image forming, and the number of the printing materials used in the image forming.

8. The system according to claim 7, wherein the number of printing materials used in the image forming includes the number of printing materials having undergone the image forming normally.

9. A method of controlling an image processing system in which a plurality of image processing apparatuses are connected via a network and cooperate to execute image forming using printing materials, the method comprising:
selecting an image processing apparatus which permits a service and has a higher priority, as an image processing apparatus to be used for storing count information by using service information representing whether each of the plurality of image processing apparatuses permits counting usage of the printing materials in order to allow charging of service for providing the image forming associated with each user identification information, and a priority table indicating a priority for the plurality of image processing apparatuses that execute printing, wherein an image processing apparatus that inputs image data to be printed has a higher priority than a local image processing apparatus or a cooperating image processing apparatus; and transmitting, when the image forming is executed, the count information to the selected image processing apparatus, thereby causing the selected image processing apparatus to store the count information.

* * * * *